(12) United States Patent
Ofuji et al.

(10) Patent No.: US 8,248,990 B2
(45) Date of Patent: Aug. 21, 2012

(54) TRANSMISSION DEVICE

(75) Inventors: Yoshiaki Ofuji, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 657 days.

(21) Appl. No.: 12/438,349

(22) PCT Filed: Aug. 17, 2007

(86) PCT No.: PCT/JP2007/066050
§ 371 (c)(1),
(2), (4) Date: Mar. 26, 2009

(87) PCT Pub. No.: WO2008/023645
PCT Pub. Date: Feb. 28, 2008

(65) Prior Publication Data
US 2010/0177715 A1    Jul. 15, 2010

(30) Foreign Application Priority Data
Aug. 22, 2006   (JP) .................................. 2006-225914

(51) Int. Cl.
*H04J 3/08* (2006.01)
(52) U.S. Cl. ........................................ 370/326; 370/389
(58) Field of Classification Search .................. 370/329, 370/326, 389
See application file for complete search history.

(56) References Cited

U.S. PATENT DOCUMENTS

| 2004/0190482 | A1* | 9/2004 | Baum et al. | 370/347 |
| 2007/0217362 | A1* | 9/2007 | Kashima et al. | 370/330 |
| 2009/0060081 | A1* | 3/2009 | Zhang et al. | 375/267 |

FOREIGN PATENT DOCUMENTS

| EP | 1 983 671 | 10/2008 |
| WO | 2007/091519 | 8/2007 |

OTHER PUBLICATIONS

3GPP TSG RAN1 LTE Ad Hoc; "Eutra Downlink Distributed Mutiplexing and Mapping RulesTP"; R1-061896; Cannes, France, Jun. 27-30, 2006 (3 pages).
3GPP TSG RAn WG1 #45; "Resource Allocation Signalling for E-Utra"; R1-061308; NEG Group, Shanghai, China, May 8-12, 2006 (14 pages).
International Search Report (English & Japanese) (PCT/ISA/210 and PCT/ISA/220) (9 pages).
Written Opinion of ISA (Japanese) dated Nov. 13, 2007 (3 pages).

(Continued)

*Primary Examiner* — Sai-Ming Chan
(74) *Attorney, Agent, or Firm* — Osha Liang LLP

(57) ABSTRACT

A disclosed transmission device includes a frequency scheduling unit configured to allocate a resource block divided from a system bandwidth into blocks of consecutive frequency subcarriers or distributed-type resource blocks including discretely-distributed frequency subcarriers in a system bandwidth and divided from the resource block, assign locations and identification numbers of the distributed-type resource blocks divided by a predetermined division number with respect to each resource block, and determine the distributed-type resource blocks to be allocated to a user based on the assigned locations of the distributed-type resource blocks; a mapping unit configured to allocate transmission data to either the resource block or distributed-type resource blocks in accordance with the allocation; and a control information generating unit configured to generate control information with respect to a mobile station to which either the resource block or the distributed-type resource blocks are allocated based on the identification numbers.

10 Claims, 15 Drawing Sheets

OTHER PUBLICATIONS

3GPP TSG RAN WG1 Meeting #45; R1-061182 "Distributed FDMA Transmission for Shared Data Channel in E-Utra Downlink" NTT DoCoMo, et al. May 8-12, 2006; Shanghai, China (14 pages).

3GPP TSG RAN WG1 #44bis; R1-060835 "Signaling for Downlink Scheduling: Dynamic Allocation of Distributed and Localized Configuration with no Signaling" Siemens Mar. 27-31, 2006; Athens, Greece (7 pages).

3GPP TSG RAN1 #48; R1-071076 "EUTRA Downlink Distributed Multiplexing and Mapping Rules" Motorola Feb. 12-16, 2007; St. Louis, MO USA (3 pages).

3GPP TSG RAN WG1 Meeting #49bis; R1-072917 "Resource Block Mapping for EUTRA Downlink Distributed Transmissions" Mitsubishi Electric et al. Jun. 25-29, 2007; Orlando, FL USA (6 pages).

* cited by examiner

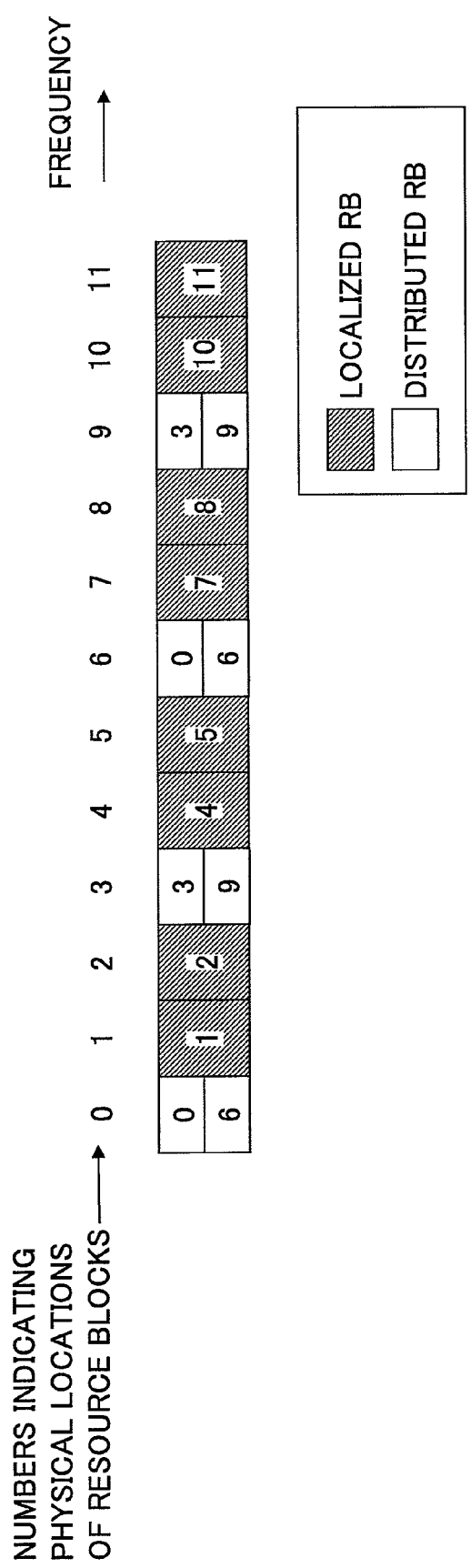

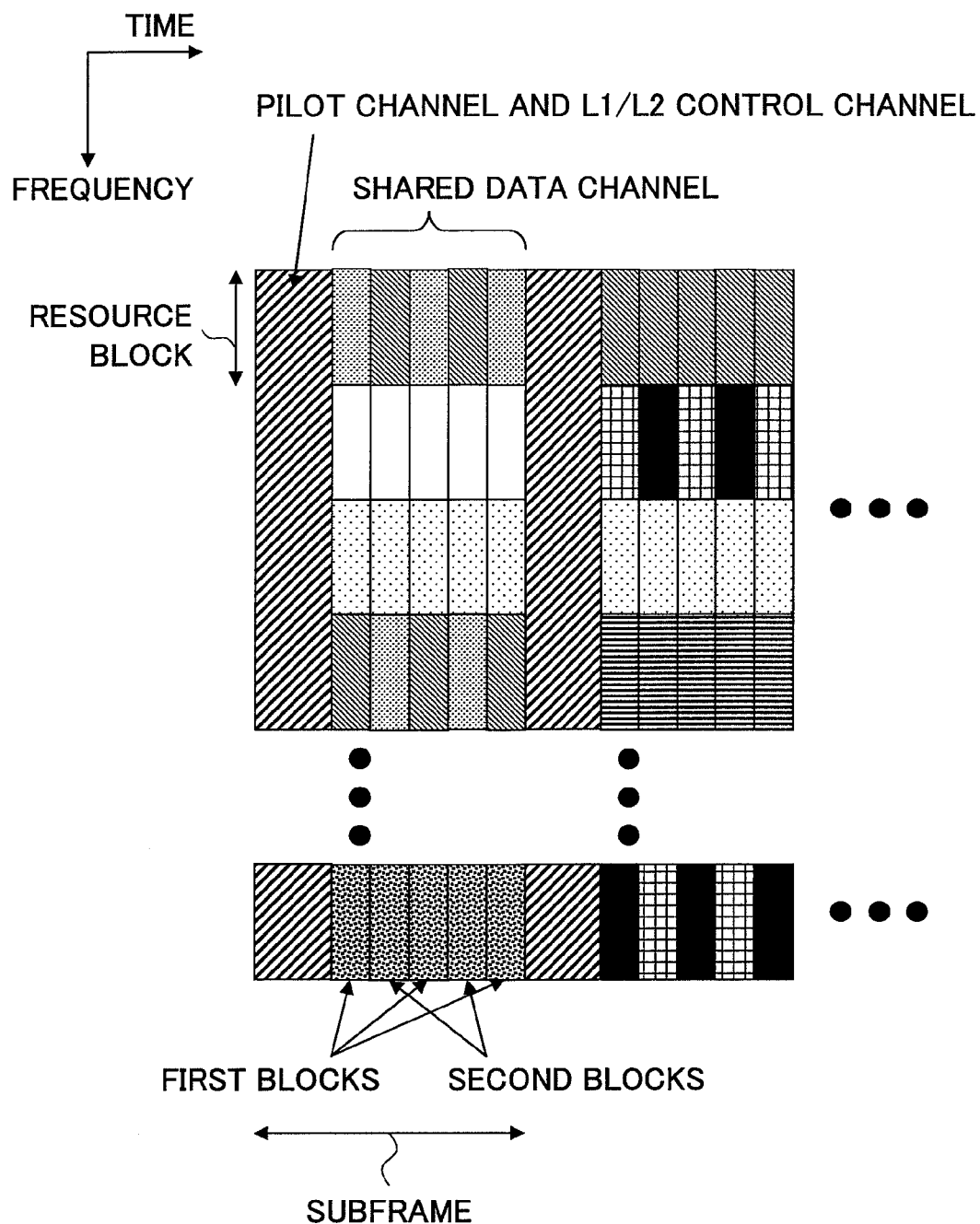

FIG.8

| ALLOCATION UNIT ($N_{DVRB}$) OF DISTRIBUTED-TYPE RESOURCE BLOCK | 2 | 3 | 4 | 5 | 6 | 7 | 8 | 9 | 10 | 11 | 12 |
|---|---|---|---|---|---|---|---|---|---|---|---|
| IDENTIFICATION NUMBERS OF DISTRIBUTED-TYPE RESOURCE BLOCK | 6,7 | 0-2 | 6-9 | 3-7 | 0-5 | 3-9 | 0-7 | 3-11 | 0-9 | – | 0-11 |

TRANSMISSION DEVICE

TECHNICAL FIELD

The present invention generally relates to an LTE (Long Term Evolution) system, and more particularly to a transmission device.

BACKGROUND ART

As a communication system succeeding W-CDMA and HSDPA, an LTE (Long Term Evolution) system is being worked on by the 3GPP ($3^{rd}$ Generation Partnership Project), which is the standardization group for W-CDMA. In the LTE system, an OFDMA (Orthogonal Frequency Division Multiple Access) system is being considered for the downlink, and an SC-FDMA (Single-Carrier Frequency Division Multiple Access) system is being considered for the uplink.

In the OFDMA system, a frequency bandwidth is divided into plural narrower frequency bandwidths (subcarriers), and data are transmitted by being carried on one of the narrower frequency bandwidths. By contiguously arranging the subcarriers without interfering with each other though the subcarriers may be partially overlapped, it becomes possible to achieve fast transmission and improve the use efficiency of the frequency bandwidths.

The SC-FDMA is a transmission system in which a frequency bandwidth is divided so that plural terminals can transmit using different frequency bandwidths among the terminals to reduce the interference between the terminals. The SC-FDMA has the characteristic of small variation of the transmitting power. Therefore, the configuration of the transmitter of the terminal can be relatively simplified.

In addition, as transmission methods in a downlink data channel, there are localized transmission and distributed transmission.

In localized transmission, as shown in FIG. 1A, frequency resources are allocated to each user by frequency blocks. For example, in localized transmission, the frequency blocks having good frequency selective fading are allocated. Generally, localized transmission may be effectively used when the size of the transmission data is large and the frequency scheduling effect is required to be enhanced.

In distributed transmission, as shown in FIG. 1B, data are spread (distributed) across the entire available bandwidth without relation to the frequency blocks and transmitted. For example, distributed transmission is generally used when the frequency scheduling may not be performed due to fast movement of users and when the size of the transmission data is small such as the case of VoIP.

In LTE system, it is required for a single system to support various sizes of packets ranging from packets having a larger size used in browsing a Web site or the like to packets having a smaller size used in VoIP or the like in communications with slow moving users and fast moving users as well.

To support both localized transmission and distributed transmission by a single system, there has been proposed a communication device in which, when distributed transmission is performed at the resource block level, one resource block is divided into plural divided blocks, and the divided blocks are allocated as the resource blocks.

This communication device generates control information with respect to a mobile station to which the resource blocks are allocated. For example, identification codes, such as identification numbers indicating the physical locations of the plural resource blocks that have been formed by dividing a system bandwidth (namely, an allocated bandwidth) are allocated.

In this case, a division number of the resource blocks to be used for distributed transmission among the plural resource blocks is set equal to an allocation unit of the divided resource blocks to be allocated to a mobile station as a unit and is defined as "$N_D$" (where $N_D$ is an integer number greater than 0). FIG. 2A shows a case where $N_D$=2. According to FIG. 2A, in a case of $N_D$=2, each of the resource blocks used for distributed transmission is divided into two parts (divided resource blocks), and the two divided resource blocks, namely a pair of the divided resource blocks becomes a unit to be allocated to a mobile station. In this case, the physical locations of the resource blocks used for distributed transmission are determined in advance in accordance with the total number of resource blocks used for distributed transmission.

As shown in FIG. 2B, a specific signaling format for transmitting the allocation information includes each field for an ID (UE-ID) of an allocated mobile station, a transmission type indicating which of localized transmission or distributed transmission is to be performed, and allocation information with respect to each resource block, namely, the resource block for localized transmission and the resource block for distributed transmission. In the fields for the allocation information with respect to the resource blocks, subfields corresponding to the resource blocks are provided, and information of allocated or non-allocated is assigned to the subfields. An assigning method of the allocation information with respect to each of the resource blocks is called "bitmap". A base station transmits control bits including such allocation information of as many numbers as the number of mobile stations allocated to perform localized transmission and distributed transmission.

Non Patent Document 1: 3GPP, R1-061896, Motorola, June 2006

Non Patent Document 2: 3GPP, R1-061308, NEC "Resource Allocation Signaling for E-UTRA," May 2006

DISCLOSURE OF INVENTION

Problems to be Solved by the Invention

However, the prior art described above has the following problem.

In the above communication device, if the number of necessary resource blocks used for distributed transmission is not equal to an integral multiple of the division number "$N_D$" of the resource blocks to be used for distributed transmission, extra resource blocks to be used for distributed transmission, namely the resource blocks not allocated to a mobile station for distributed transmission, may be generated.

Namely, if the number of necessary pairs of divided resource blocks for a user who uses distributed transmission is other than an integral multiple of the division number ($N_D$) of the resource blocks to be used for distributed transmission, extra divided resource blocks, namely the divided resource blocks not allocated to a user for distributed transmission may be generated, or divided resource blocks allocated to a user who is not required to perform distributed transmission may be generated.

To overcome the problem, a technique is proposed in which the number of resource blocks to be used for distributed transmission is set equal to the division number of the resource blocks to be used for distributed transmission and is defined as the same value "$N_D$", and the value "$N_D$" is a variable to be set and announced (see, for example, Non Patent Document 1).

FIG. 3A shows a case where the number of resource blocks to be used for distributed transmission and the division number of the resource blocks to be used for distributed transmission are three (3). In this case, the physical locations of the resource blocks to be used for distributed transmission are determined in advance in accordance with the number of the resource blocks to be used for distributed transmission.

In this case, as shown in FIG. 3B, a specific signaling format includes a field for announcing "$N_D$" in addition to the fields for an ID (UE-ID) of an allocated mobile station, a transmission type indicating which of localized transmission or distributed transmission is to be performed, and allocation information with respect to each resource block.

According to this proposal, the physical locations of the resource blocks to be used for distributed transmission are determined in advance in accordance with the number of resource blocks to be used for distributed transmission. Therefore, the physical locations of the resource blocks to be used for distributed transmission differ depending on the number of resource blocks to be used for distributed transmission.

Further, in order to know the mapping location, namely the symbol location to be demodulated, of the resource blocks that are allocated to a mobile station and that are to be used for distributed transmission, the base station that is to perform distributed transmission is required to announce the number of resource blocks to be used for distributed transmission (=the division number of the resource blocks to be used for distributed transmission) "$N_D$", thereby increasing the number of signaling bits.

The present invention is made to solve the above-mentioned problem and may provide a transmission device capable of supporting localized transmission and distributed transmission in a single system and capable of announcing without increasing the number of signaling bits even when the number of resource blocks to be used for distributed transmission is other than an integral multiple of the division number of the resource blocks to be used for distributed transmission.

Means for Solving the Problems

According to an aspect of the present invention, a transmission device includes a frequency scheduling unit configured to allocate either a resource block divided from a system bandwidth into blocks of consecutive frequency subcarriers or distributed-type resource blocks including discretely-distributed frequency subcarriers in a system bandwidth and divided from the resource block into plural parts, assign locations and identification numbers of the distributed-type resource blocks divided by a predetermined division number with respect to each resource block in accordance with an allocation unit number of the distributed-type resource blocks to the distributed-type resource blocks allocated from the resource block as a unit, and determine the distributed-type resource blocks to be allocated to a user based on the assigned locations of the distributed-type resource blocks;

a mapping unit configured to allocate transmission data to either the resource block or distributed-type resource blocks in accordance with the allocation; and a control information generating unit configured to generate control information with respect to a mobile station to which either the resource block or the distributed-type resource blocks are allocated based on the identification numbers.

By having this configuration, it becomes possible to generate the resource blocks to be used for distributed transmission without deficiency and without excess based on the locations and the identification numbers of the distributed-type resource blocks divided by using the division number predetermined with respect to each resource block even if the number of resource blocks to be used for distributed transmission is a number other than the integral multiple of the division number of the resource blocks to be used for distributed transmission and to announce the mapping location of the transmission data to each user without increasing the signaling bits.

According to an aspect of the present invention, a transmission device includes a frequency scheduling unit configured to allocate either a resource block divided from a system bandwidth into blocks of consecutive frequency subcarriers or distributed-type resource blocks including discretely-distributed frequency subcarriers in a system bandwidth and divided from the resource block into plural parts, assign, in accordance with a predetermined number of resource blocks used as the distributed-type resource blocks and a predetermined number of the distributed-type resource blocks generated in the resource blocks, locations of the resource blocks used as the distributed-type resource blocks and identification numbers of the distributed-type resource blocks, and determine the distributed-type resource blocks to be allocated to a user;

a mapping unit configured to allocate transmission data to either the resource block or distributed-type resource blocks in accordance with the allocation; and a control information generating unit configured to generate control information with respect to a mobile station to which either the resource block or the distributed-type resource blocks are allocated based on the identification numbers.

By having this configuration, it becomes possible to determine the distributed-type resource blocks to be allocated to a user in accordance with the predetermined number of resource blocks to be used as the distributed-type resource blocks and the predetermined number of the distributed-type resource block generated in the resource blocks.

Advantageous Effect of the Invention

According to an embodiment of the present invention, a transmission device is realized that can support localized transmission and distributed transmission in a single system and, even when the number of resource blocks to be used for distributed transmission is other than an integral multiple of the division number of the resource blocks to be used for distributed transmission, generate the resource blocks to be used for distributed transmission without deficiency and without excess, and announce the mapping locations of the transmission data to each user without increasing the signaling bits.

BRIEF DESCRIPTION OF THE DRAWINGS

FIG. 2A is a drawing showing an example of frequency scheduling;

FIG. 6A is a drawing showing frequency scheduling in a transmission device according to an embodiment of the present invention;

FIG. 8 is a drawing showing an example of correspondence between an allocation unit number of distributed-type resource blocks and identification numbers of the distributed-type resource blocks;

EXPLANATION OF REFERENCES

Figure 1A:
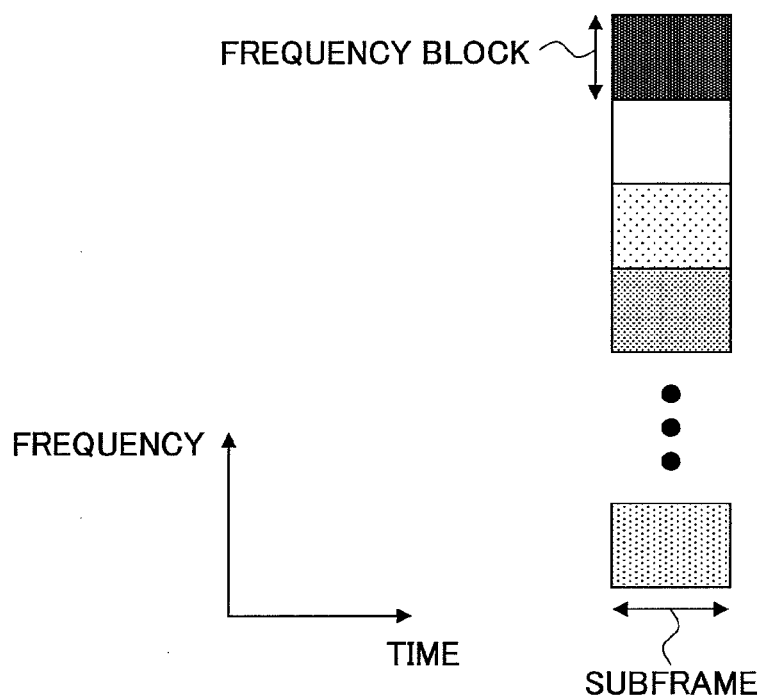
FIG. 1A is a drawing showing a localized transmission.
Figure 1B:
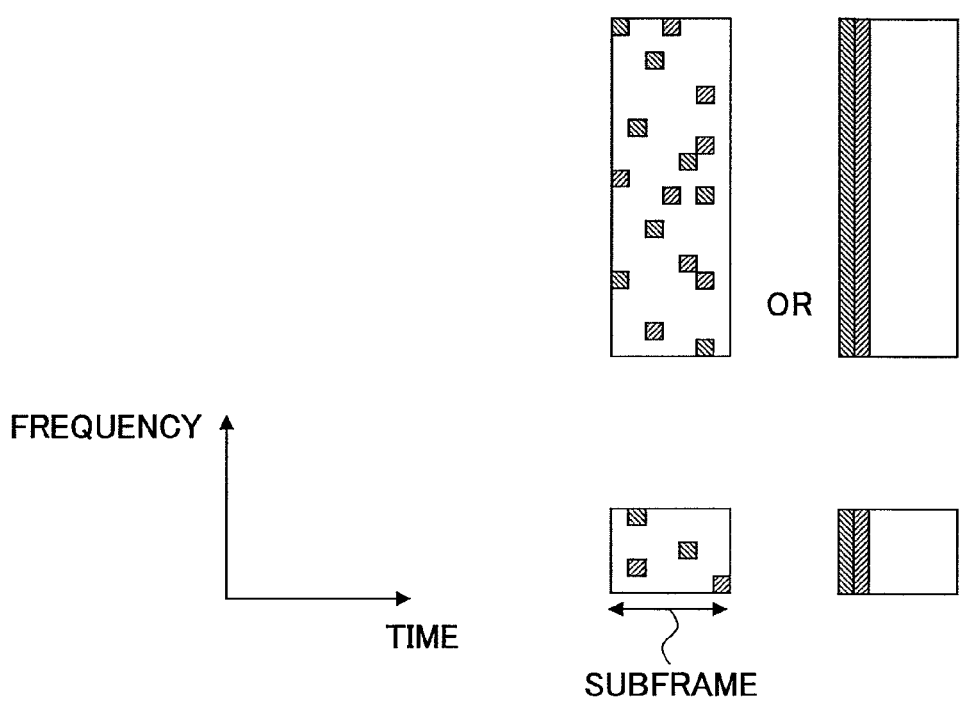
FIG. 1B is a drawing showing a distributed transmission.
Figure 2B:
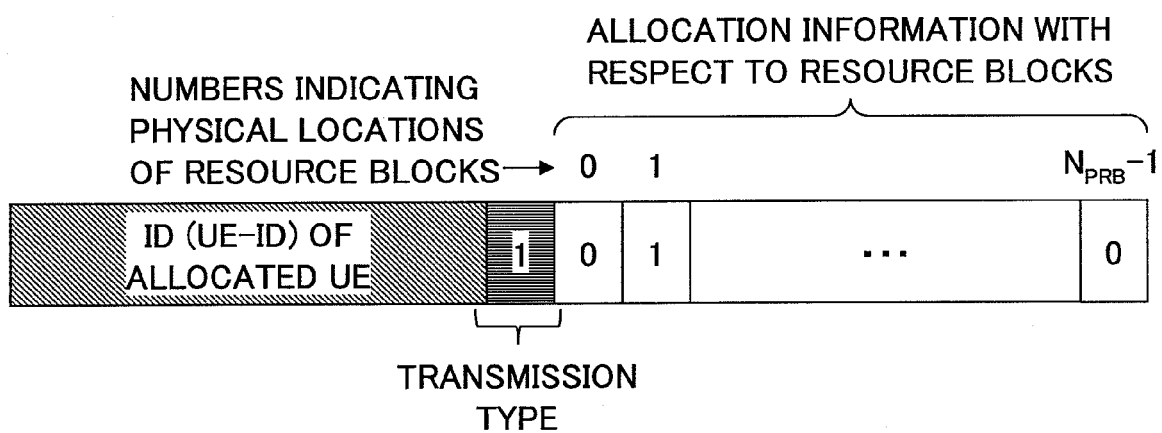
FIG. 2B is a drawing showing an example of a signaling format.
Figure 3A:
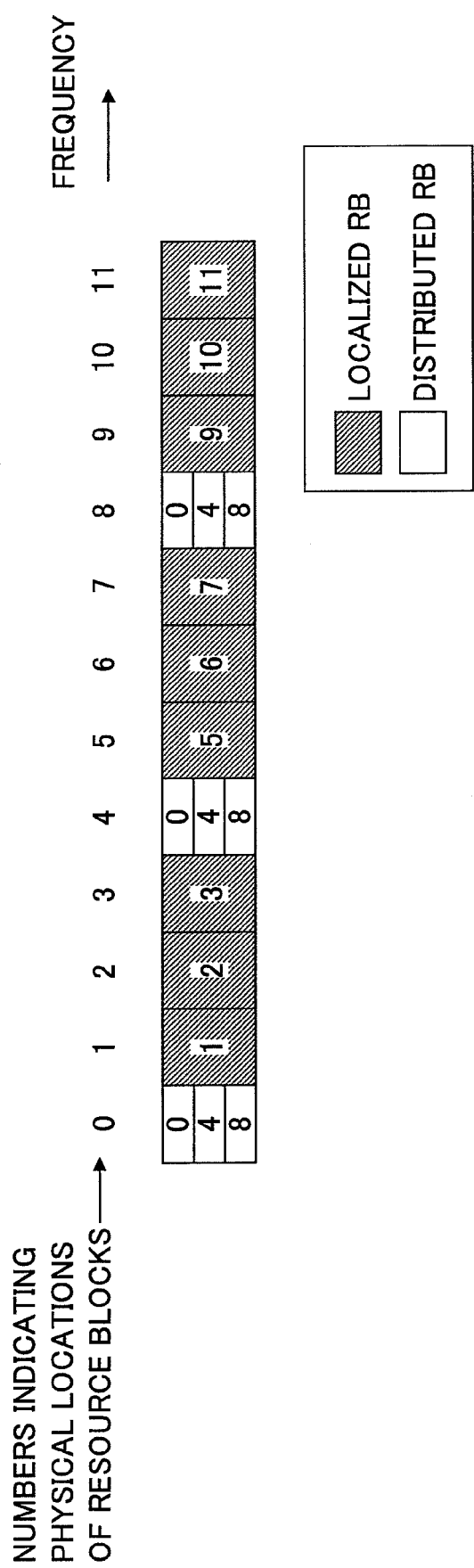
FIG. 3A is a drawing showing an example of frequency scheduling.
Figure 3B:
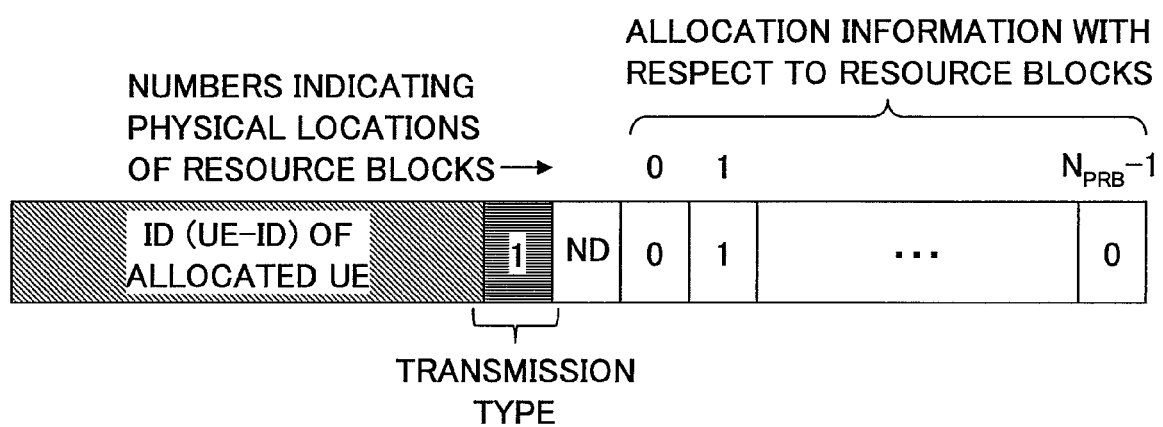
FIG. 3B is a drawing showing an example of a signaling format.

100 TRANSMISSION DEVICE
102 RESOURCE BLOCK (RB) ALLOCATION RATIO SWITCHING SECTION
104 FREQUENCY SCHEDULING SECTION
106 CONTROL INFORMATION GENERATING SECTION
108,114 CODING RATE/DATA MODULATION DETERMINING SECTION
110,116 MAPPING SECTION
112 TRANSMISSION DATA GENERATING SECTION

BEST MODE FOR CARRYING OUT THE INVENTION

Next, the best mode for carrying out the invention is described based on the following embodiments with reference to the accompanying drawings.

In all the figures, the same reference numerals are commonly used for the elements having the same function, and repeated descriptions of such elements are omitted.

A transmission device according to an embodiment of the present invention is described with reference to FIG. 4.

A transmission device 100 according to the embodiment of the present invention performs distributed transmission at localized transmission level. The transmission device 100 may be incorporated in, for example, a base station. Namely, a resource block used for localized transmission is divided into plural parts and the thus-divided resource blocks (divided resource blocks) are allocated to a user who uses distributed transmission.

Figure 4:
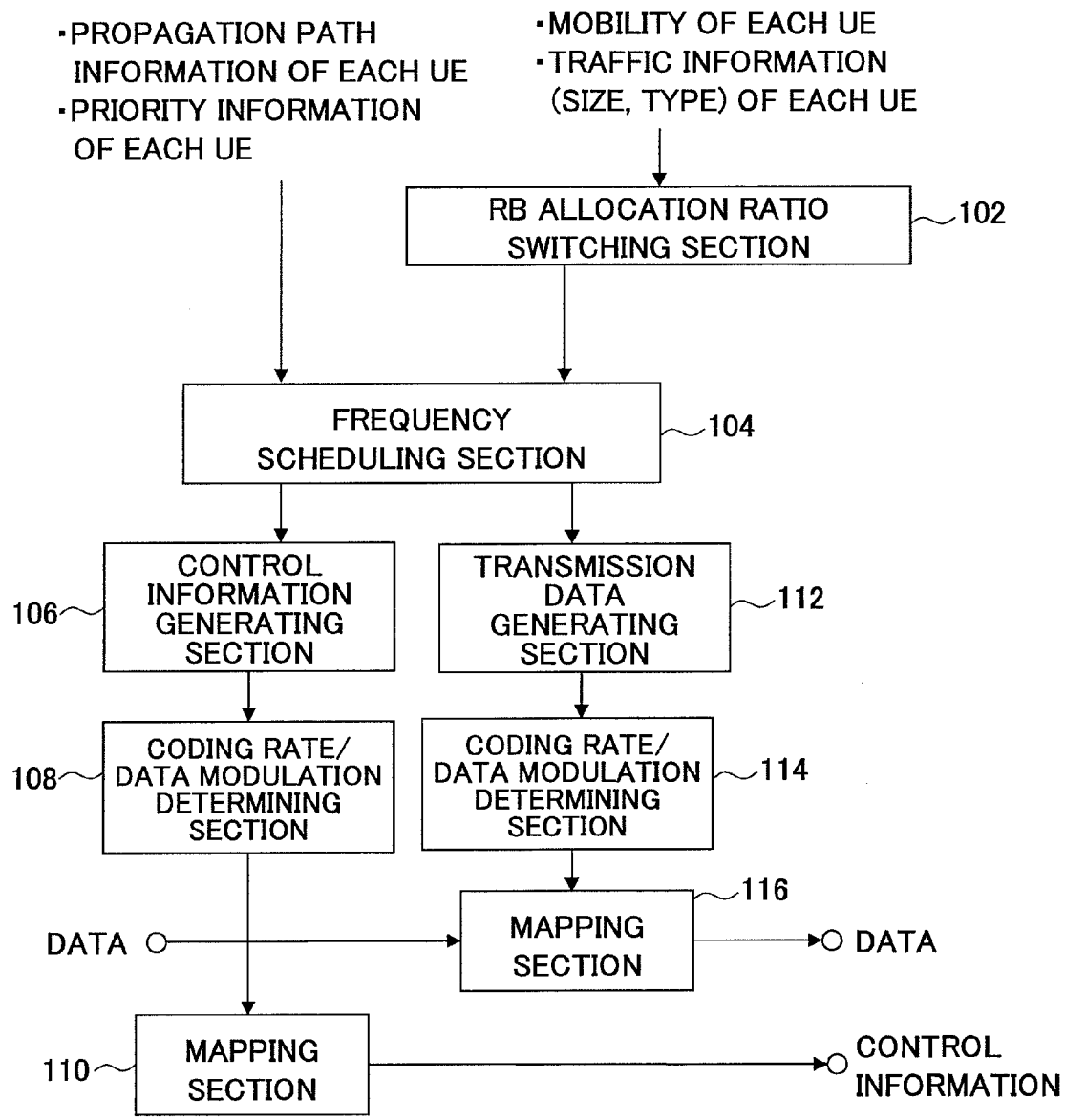
FIG. 4 is a partial block diagram showing a transmission device according to an embodiment of the present invention.

As shown in FIG. 4, the transmission device 100 includes a resource block (RB) allocation ratio switching section 102, a frequency scheduling section 104, a control information generating section 106, a transmission data generating section 112, coding rate/data modulation determining sections 108 and 114, and mapping sections 110 and 116. Information indicating the mobility of each mobile station (UE) and information indicating traffic of each mobile station such as size and type are input to the resource block (RB) allocation ratio switching section 102. Propagation path information of each mobile station such as the status of the downlink propagation path, the priority information of each mobile station, and the output signal from the resource block allocation ratio switching section 102 are input to the frequency scheduling section 104. The output signal from the frequency scheduling section 104 is input to the control information generating section 106 and the transmission data generating section 112. The output signal from the control information generating section 106 is input to the coding rate/data modulation determining section 108, and the output signal from the transmission data generating section 112 is input to the coding rate/data modulation determining section 114. The mapping section 110 receives the output signal from the coding rate/data modulation determining section 108 and outputs control information. The mapping section 116 receives the output signal from the coding rate/data modulation determining section 114 and data and outputs data.

The resource block allocation ratio switching section 102 determines mobile stations to perform localized transmission and mobile stations to perform distributed transmission based on the information indicating the mobility of each mobile station (UE), the information indicating traffic, and the like. The resource block allocation ratio switching section 102 further determines the allocation ratio of the resource blocks to be allocated to the mobile stations that performs localized transmission to those to be allocated to the mobile stations that performs distributed transmission, and inputs the determined value of the allocation ratio to the frequency scheduling section 104 as resource block allocation ratio information.

The resource block allocation ratio switching section 102 determines that, for example, a mobile station having high mobility and a mobile station transmitting traffic having small data size such as VoIP are the mobile stations which are to perform distributed transmission. Further, upon determining the allocation ratio of the resource blocks, the resource block allocation ratio switching section 102 increases the rate of resource blocks allocated to perform distributed transmission when, for example, there are many mobile stations having high mobility or there are many mobile stations that transmit traffic data having a small data size such as in VoIP.

The frequency scheduling section 104 allocates resource blocks to each mobile station based on the input information indicating the propagation path of each mobile station, priority information indicating priority of each mobile station, and the resource block allocation ratio information. Herein, the priority information refers to digitized information with respect to each mobile station by considering the items such as whether a retransmission request is included, the elapsed time after packets are transmitted from a transmission terminal, a target transmission rate, the actual throughput, and an allowable delay in the packet transmission.

For example, the frequency scheduling section 104 adaptively switches the allocation ratio of the resource blocks which are to perform localized transmission to the resource blocks which are to perform distributed transmission at every predetermined cycle such as at every cycle of scheduling based on the status of each mobile station such as a channel status and the resource block allocation ratio information determined in accordance with the traffic. By doing this, the throughput of a data channel may be increased.

Further, the frequency scheduling section 104 may be configured to switch the allocation ratio of the resource blocks which are to perform localized transmission to the resource blocks which are to perform distributed transmission at a longer period based on the status of each mobile station such as the resource block allocation ratio information determined in accordance with the traffic. By doing this, the control may be performed more easily compared with the case where the switching is performed at every cycle of scheduling. Further, the number of control bits for announcing the resource block allocation number to the mobile stations which are to perform distributed transmission may be reduced.

Figure 5:
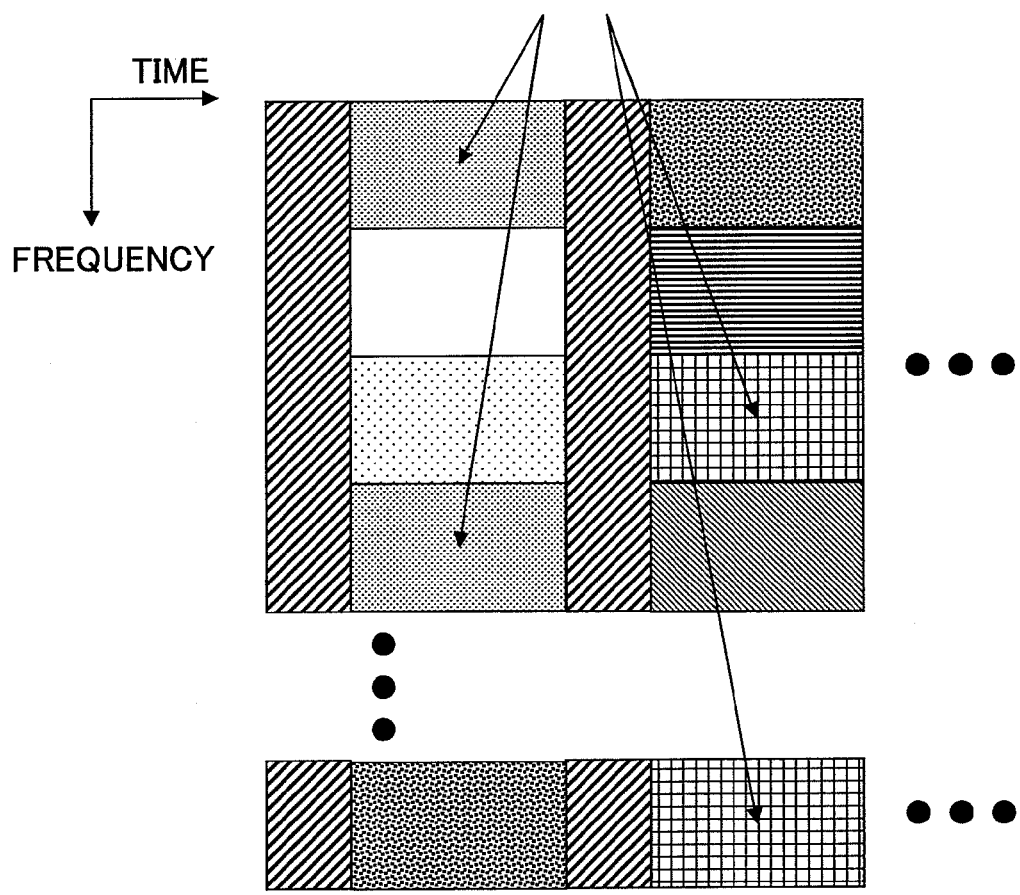
FIG. 5 is a drawing showing frequency scheduling in a transmission device according to an embodiment of the present invention.

For example, as shown in FIG. 5, the frequency scheduling section 104 allocates the data to be transmitted in localized transmission and the data to be transmitted in distributed transmission by using the resource block serving as an allocation unit. Namely, the frequency scheduling section 104 allocates, to each user, distributed-type resource blocks that are frequency subcarrier blocks discretely-distributed in a system bandwidth by using resources blocks that are consecutive frequency carrier blocks obtained by dividing the system bandwidth, as allocation units.

When distributed transmission is to be performed at the resource block level, the frequency scheduling section 104 divides one resource block into plural parts, for example, "N" divided parts (where N is an integer number greater than 0). Namely, the frequency scheduling section 104 allocates the distributed-type resource blocks as the resource block with respect to a user who uses distributed transmission. Herein, the resource blocks may also be regarded as units for mapping users or, for example, units for allocating a certain user.

For example, as shown in FIG. 6A, the frequency scheduling section 104 divides one resource block into plural parts such as two parts in the time direction and allocates the resource block with respect to users who use distributed transmission to each mobile station that performs distributed transmission such as two users. As shown in FIG. 6A, the frequency scheduling section 104 allocates first blocks and second blocks to different users.

Figure 6B:
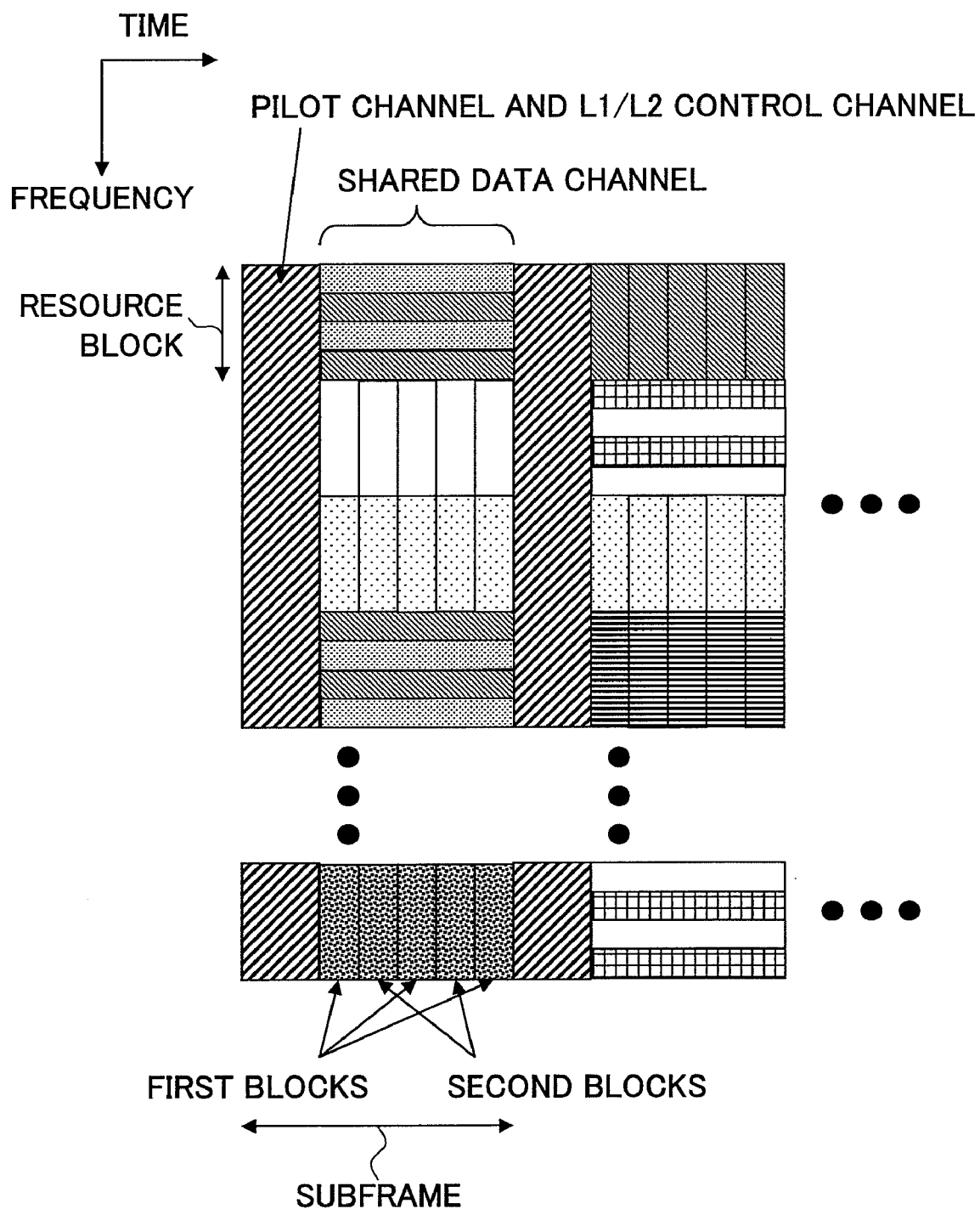
FIG. 6B is a drawing showing frequency scheduling in a transmission device according to an embodiment of the present invention.

Further, for example, as shown in FIG. 6B, the frequency scheduling section 104 may divide one resource block into plural parts such as two parts in the frequency direction and allocate the resource block to each mobile station such as two users. For example, as shown in FIG. 6B, the frequency scheduling section 104 allocates first blocks and second blocks to different users.

In FIGS. 6A and 6B, the first two symbols represent a pilot and signaling bits, i.e., a pilot channel and an L1/L2 control channel.

In distributed transmission at resource block level, a frequency diversity effect cannot be obtained unless plural resource blocks are being allocated. In such a case where the size of the traffic data is small such as in VoIP, all data may be fit in one resource block and the frequency diversity effect cannot be obtained. In a case of VoIP, the data size of one packet is, for example, 180 bits. As described above, by dividing a resource block into N parts, it becomes possible to separately allocate the packet data that can otherwise be included in a single resource block to N distributed-type resource blocks, thereby increasing the frequency diversity effect.

The control information generating section 106 generates control information with respect to the mobile station to which the resource blocks are allocated by the frequency scheduling section 104.

The coding rate/data modulation determining section 108 determines a coding rate and a data modulation value that are used when the control information is transmitted.

The mapping section 110 performs the data modulation and coding that are determined by the coding rate/data modulation determining section 108 and performs mapping on a physical channel. As a result, the control information is transmitted.

The transmission data generating section 112 generates transmission data in accordance with the number of resource blocks allocated to each mobile station. For example, the transmission data generating section 112 determines the amount of transmission data.

The coding rate/data modulation determining section 114 determines a coding rate and a data modulation value with respect to the data of each mobile station allocated by the frequency scheduling section 104 and the control information.

The mapping section 116 performs the data modulation, coding, and mapping on a physical channel.

Next, a specific example of the operations of the above-mentioned frequency scheduling section 104 is described in detail.

As described above, when the system bandwidth is divided into plural parts, each of the divided bandwidths is called a resource block. In this embodiment of the present invention, the number of resource blocks obtained by dividing an allocated bandwidth is defined as "$N_{PRB}$" (where $N_{PRB}$ is an integer number greater than 1). The identification codes such as identification numbers are allocated to each resource block to identify each resource block.

In this embodiment of the present invention, for example, a case is described where the allocated bandwidth is divided into 12 parts ($N_{PRB}$=12), and numbers 0 through 11 indicating the physical locations of the corresponding resource blocks are allocated. However, this embodiment of the present invention may be applied to cases where the division number is lower than 12 and greater than 12.

In the transmission device 100 according to this embodiment of the present invention, plural division numbers $N_D$ of the resource block are provided (where $N_D$ is an integer number greater than 0). For example, the division numbers $N_D$ of the resource block is fixed at $N_D$=2 or $N_D$=3. Namely, two (2) or three (3) divided resource blocks (distributed-type resource blocks) used for distributed transmission are generated from two (2) or three (3) resource blocks.

In this embodiment of the present invention, a dividing pattern of the resource block used for distributed transmission is determined in advance. For example, as shown in FIG. 7, a pattern in which two (2) distributed-type resource blocks used for the distribution transmission are generated from one physical resource block and another pattern in which three (3) distributed-type resource blocks used for the distribution transmission are generated from one physical resource block are mixed in the frequency direction.

An identification number is assigned to each distributed-type resource block. In this case, consecutive identification numbers are assigned to the divided resource blocks that belong to the same physical resource block. Each of the divided resource blocks having the same identification number is allocated to the same user.

Figure 7:
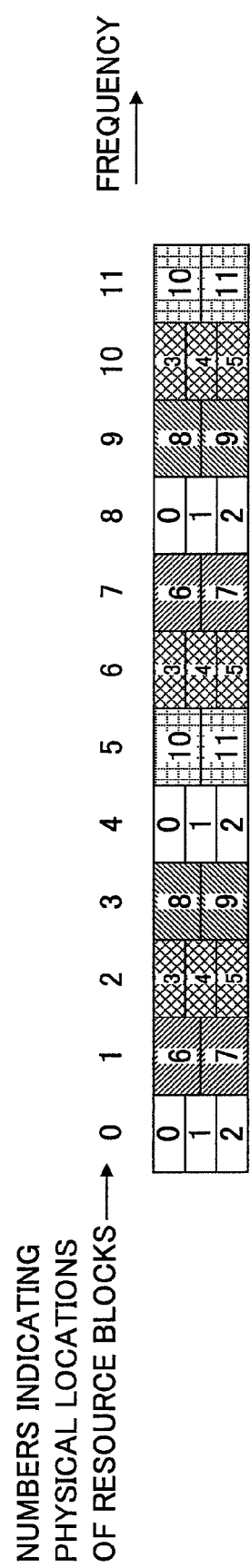
FIG. 7 is a drawing showing a dividing pattern of the resource blocks to be used for distributed transmission.

Further, at least a part of the resource block including the distributed-type resource blocks shown in FIG. 7 is allocated in accordance with the allocation unit number (one resource block in this embodiment) of the distributed-type resource blocks required by a user who is to use distributed transmission. In other words, in accordance with the allocation unit number of the distributed-type resource blocks required by a user who is to use distributed transmission, at least a part of the resource blocks is replaced by a resource block including the distributed-type resource blocks shown in FIG. 7. For example, when two distributed-type resource blocks used for distributed transmission are generated from two resource blocks, the allocation unit number of the distributed-type resource blocks is 2. Further, when three distributed-type resource blocks used for distributed transmission are generated from three resource blocks, the allocation unit number of the distributed-type resource blocks is 3. As shown in FIG. 8, in response to an allocation unit number ($N_{DVRB}$) of the distributed-type resource blocks that are required by a user who is to use distributed transmission (where, $N_{DVRB}$ is an integer number greater than 1), identification numbers to replace the resource blocks by the distributed-type resource blocks are assigned. As a result, in response to the allocation unit number, the identification number and the locations of the distributed-type resource blocks divided based on the predetermined division number with respect to each resource block are assigned.

Figure 9:
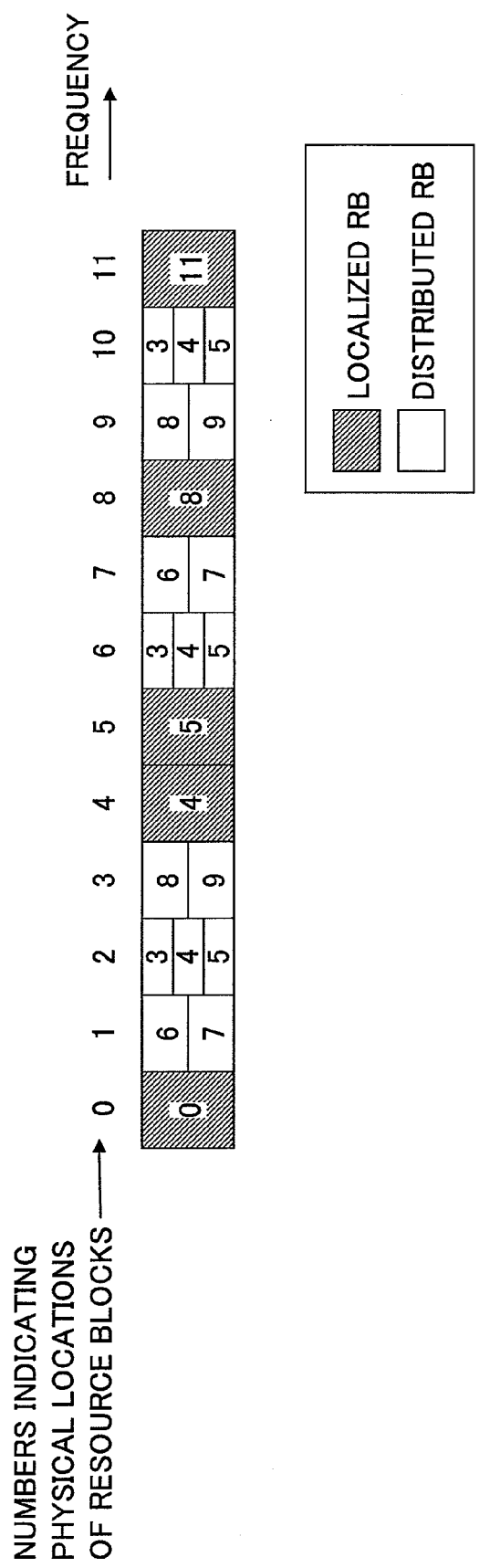
FIG. 9 is a drawing showing an example of the frequency scheduling in a transmission device according to an embodiment of the present invention.

For example, when the number is 7, namely the allocation unit number of the distributed-type resource blocks is 7, according to FIG. 8, the numbers from 3 through 9 of the identification numbers of the distributed-type resource blocks are assigned. Therefore, as shown in FIG. 9, the resource blocks corresponding to the resource blocks having the identification numbers 1 through 3, 6, 7, 9, and 10 are replaced by the distributed-type resource blocks corresponding to the distributed-type resource blocks having the identification numbers 3 through 9 in FIG. 7.

When cells of one base station are configured by plural directional antennas, namely when there are plural divided sectors (cells) in a cover area of a base station, the division pattern of the resource blocks that are to perform distributed transmission described with reference to FIG. 7 may be different depending on each sector (cell). By doing this, the cell interference may be randomized, and thereby the reception quality at a mobile station may be improved.

Next, the control information generated by the control information generating section 106 is described with reference to FIGS. 10A and 10B.

In this embodiment of the present invention, the control information with respect to mobile stations that perform localized transmission is different from that with respect to mobile stations that perform distributed transmission.

Figure 10A:
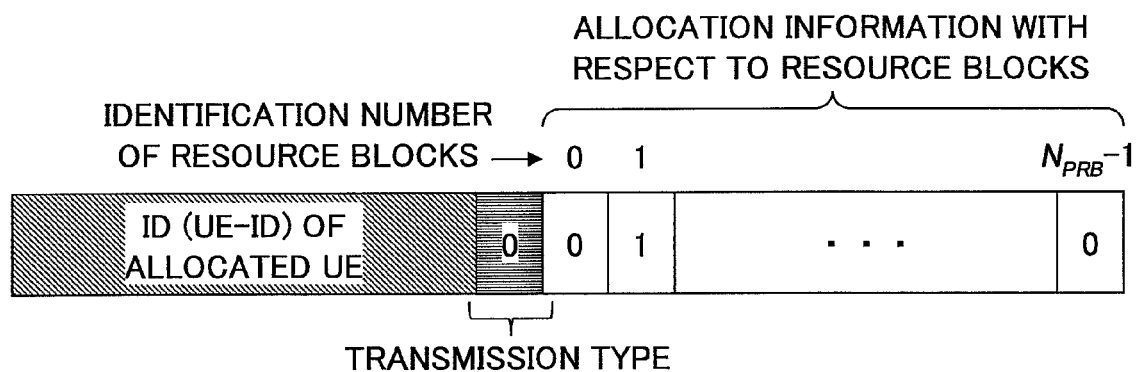
FIG. 10A is a drawing showing an example of the signaling format with respect to a user who uses localized transmission in a transmission device according to an embodiment of the present invention.

As shown in FIG. 10A, the control information with respect to mobile stations that perform localized transmission includes each field for an ID (UE-ID) of an allocated mobile station, a transmission type indicating which of localized transmission or distributed transmission is to be performed, and allocation information with respect to each resource block.

The allocation information with respect to each resource block includes plural sub-fields corresponding to the identification numbers of the resource blocks, and information indicating allocated or non-allocated is added to each sub-field. For example a value 1 is assigned when allocated and a value 0 is assigned when not allocated.

Figure 10B:
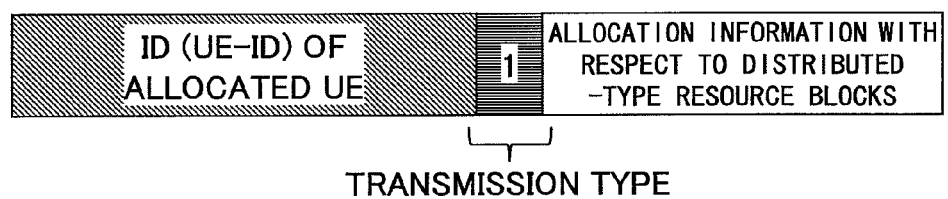
FIG. 10B is a drawing showing an example of the signaling format with respect to a user who uses distributed transmission in a transmission device according to an embodiment of the present invention.

As shown in FIG. 10B, the control information with respect to mobile stations that perform distributed transmission includes each field for an ID (UE-ID) of the allocated mobile station, a transmission type indicating which of localized transmission or distributed transmission is performed, and allocation information with respect to the divided resource blocks.

As the allocation information with respect to each divided resource block, the information obtained by applying the tree based allocation information is assigned (see, for example, Non Patent Document 2).

Figure 11:
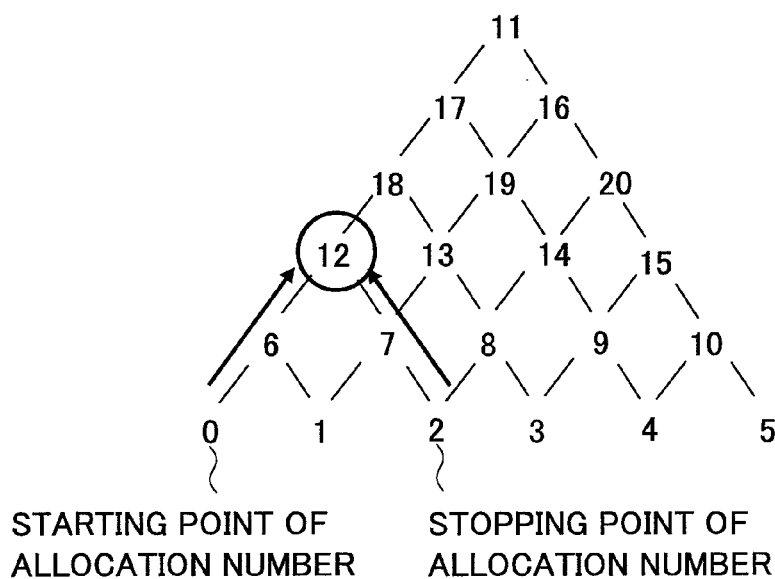
FIG. 11 is a drawing showing a Tree based Resource Allocation method.

When the tree based allocation information is applied, a number at a point is announced, the point being where a straight line extended from the point indicating the starting number of the allocation number and a straight line extended from the point indicating the stopping number of the allocation number cross on the tree diagram of FIG. 11 (in FIG. 11, the starting number of the allocation number is 0, and the stopping number of the allocation number is 2, therefore the number 12 is obtained). Namely, a predetermined identification number is assigned based on the identification number indicating the starting number of the allocation number and the indication number indicating the stopping number of the allocation number.

The number of the numbers necessary for expressing the tree depends on the number of the divided resource blocks. More specifically, the number of the numbers necessary for expressing the N divided resource blocks can be expressed by the formula: $N \times (N+1)/2$. Therefore, in this case, the necessary number of bits for announcing the allocation information by using the tree based allocation information can be expressed by the formula: $\log_2 N \times (N+1)/2$.

By using such tree based allocation information, it becomes possible to reduce the information amount of the allocation information that is transmitted to indicate consecutive numbers, from what number to what number, assigned to the distributed-type resource blocks to be used for distributed transmission.

As described above, by allocating based on the tree based allocation information, a mobile station may specify allocation locations when only allocation information, namely an identification number predetermined based on the identification number indicating the starting point of the allocation number and the identification number indicating the stopping point of the allocation number, is announced.

According to this embodiment of the present invention, a generation pattern of the distributed-type resource blocks can be fixed. Therefore, it is not necessary to announce the number of distributed-type resource blocks to be used for distributed transmission regardless of the number of the distributed-type resource blocks to be used for distributed transmission. Namely, by announcing the allocation information with respect to the distributed-type resource blocks, the allocation unit number of the distributed-type resource blocks is uniquely specified. Therefore, what is necessary is to announce one bit indicating the transmission type whether localized transmission or distributed transmission is to be performed. Namely, as shown in FIG. 8, the allocation unit with respect to the distributed-type resource blocks can be uniquely specified based on the allocation information with respect to the distributed-type resource blocks.

Further, in a case where plural distributed-type resource blocks are allocated to the same mobile station, when the distributed-type resource blocks having consecutive identification numbers are allocated, the allocation of the divided resource blocks using the tree based allocation information may be announced, thereby reducing the signaling bits.

Next, a transmission device according to another embodiment of the present invention is described.

The configuration of the transmission device 100 according to this embodiment of the present invention is the same as that according to the above embodiment of the present invention. Therefore, the description of the configuration is omitted.

In the transmission device 100 according to this embodiment of the present invention, in order to effectively transmit the traffic data that require radio resources whose size is less than that of one resource block, namely the traffic data having smaller size, the distributed-type resource block is allocated so that the size of the distributed-type resource block is less than that of the original resource block. Namely, the total bandwidth of the distributed-type resource block allocated to a single user is narrower than that of one resource block.

Further, with respect to a user having low mobility as well, this distributed-type resource block may be allocated to the traffic data having smaller data size.

Figure 12:
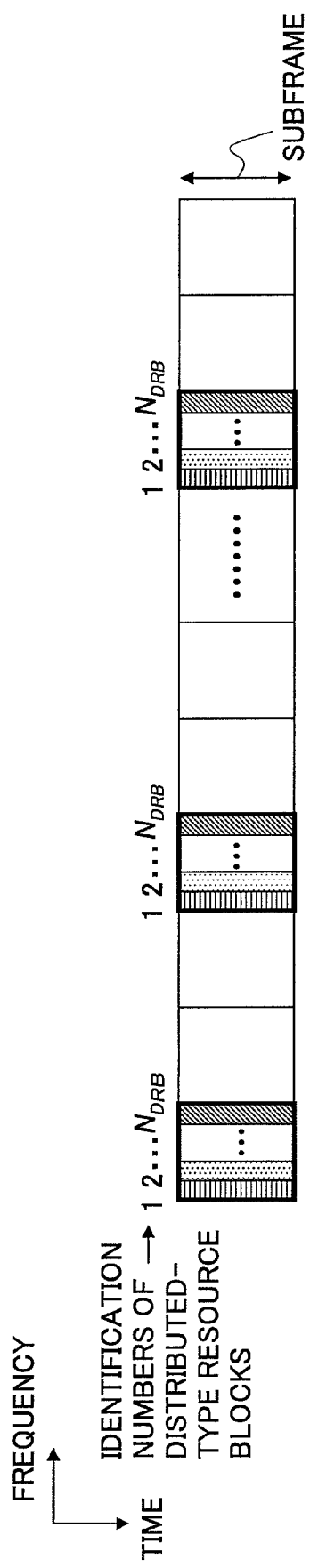
FIG. 12 is a drawing showing an example of the frequency scheduling in a transmission device according to an embodiment of the present invention.

As shown in FIG. 12, the frequency scheduling section 104 allocates data to be transmitted in localized transmission and data to be transmitted in distributed transmission.

In this transmission device 100 according to this embodiment of the present invention, when the number of the resource blocks to be replaced by the distributed-type resource blocks to be used for distributed transmission is defined as "$N_{RB\_Rep}$" (where $N_{RB\_Rep}$ is an integer number greater than 1), the locations of the resource blocks are predetermined in accordance with the number $N_{RB\_Rep}$.

Further, the number $N_{RB\_Rep}$ and the number of divided resource blocks generated in the resource block defined as "$N_{DRB}$" (where $N_{DRB}$ is an integer number greater than 1) are independently predetermined. Further, the identification numbers of the distributed-type resource blocks are predetermined based on the number of the divided resource blocks ($N_{DRB}$).

As shown in FIG. 12, each of the resource blocks to be replaced by the distributed-type resource blocks to be used for distributed transmission is divided into $N_{DRB}$ distributed-type resource blocks. One unit of the distributed-type resource block is extracted from each of the resource blocks to be used for distributed transmission. Those extracted units are gathered into one unit and the unit is collectively allocated to one user who uses distributed transmission. $N_{DRB}$ distributed-type resource blocks generated from $N_{RB\_Rep}$ resource blocks are treated as an allocation unit with respect to each user.

Further, by making $N_{DRB}$ greater than $N_{RB\_Rep}$ the total size of the allocation unit of the generated distributed-type resource blocks can be smaller than the size of one resource block. Because of this feature, it becomes possible to effectively transmit the traffic data that require radio resources whose size is less than that of one resource block, namely the traffic data having smaller size.

Next, the control information generated by the control information generating section 106 is described.

In this embodiment of the present invention, the control information with respect to a mobile station that performs localized transmission is different from the control information with respect to a mobile station that performs distributed transmission.

Figure 13A:
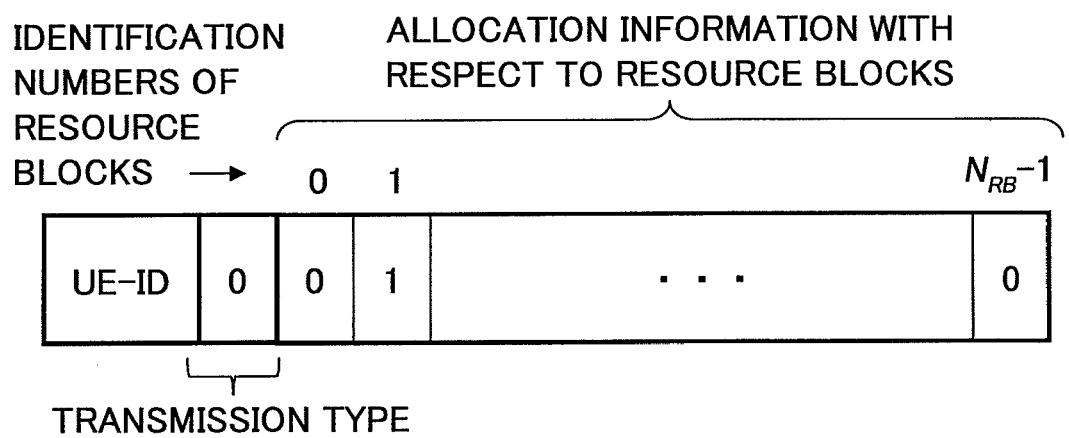
FIG. 13A is a drawing showing an example of the signaling format with respect to a user who uses localized transmission in a transmission device according to an embodiment of the present invention.

As shown in FIG. 13A, the control information with respect to a mobile station that performs localized transmission includes each field for an ID (UE-ID) of an allocated mobile station, a transmission type indicating which of localized transmission or distributed transmission is to be performed, and allocation information with respect to each resource block.

The allocation information with respect to each resource block includes plural sub-fields corresponding to the identification numbers of the resource blocks, and information indicating either allocated or non-allocated is added to each sub-field. For example a value 1 is assigned when allocated and a value 0 is assigned when not allocated.

Figure 13B:
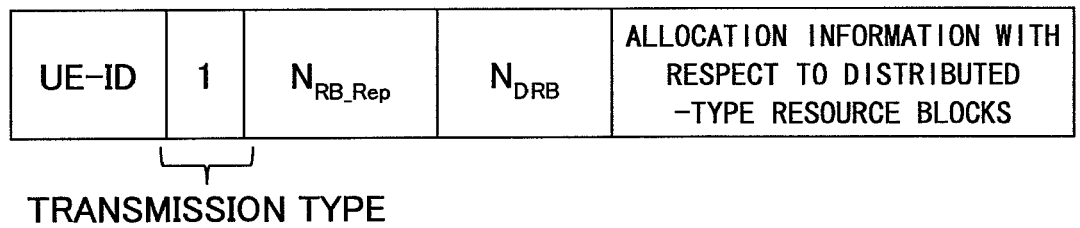
FIG. 13B is a drawing showing an example of the signaling format with respect to a user who uses distributed transmission in a transmission device according to an embodiment of the present invention.

As shown in FIG. 13B, the control information with respect to mobile stations that perform distributed transmission includes each field for an ID (UE-ID) of an allocated mobile station, a transmission type indicating which of localized transmission or distributed transmission is performed, the number ($N_{RB\_Rep}$) of resource blocks to be replaced by the distributed-type resource blocks, the number ($N_{DRB}$) of divided resource blocks generated in the resource blocks, and the allocation information with respect to each distributed-type resource block.

As described above, the information obtained by using the tree based allocation information is assigned to the allocation information with respect to each distributed-type resource block.

According to this embodiment of the present invention, it becomes possible to determine the distributed-type resource blocks to be allocated to a user in accordance with the predetermined number of the resource blocks to be used as the distributed-type resource blocks and the number of the distributed-type resource blocks generated in the resource blocks. Further, by making the number ($N_{DRB}$) of divided resource blocks generated in the resource blocks greater than the number ($N_{RB\_Rep}$) of resource blocks to be replaced by the distributed-type resource blocks that are to perform distributed transmission, the total size of the allocation unit of the generated distributed-type resource blocks may become smaller than the size of one resource block.

In the above description, the present invention is described by being divided into several embodiments. However, it should be noted that the division of the present invention into several embodiments is not an essential element of the present invention. For example, two or more embodiment may be combined on as as-needed basis. To promote an understanding of the present invention, specific values are used as examples throughout the description. However, it should be noted that such specific values are just sample values unless otherwise described, and any other values may be used.

The present invention is described by referring to a specific embodiment. However, a person skilled in the art may understand that the above embodiment is described for illustrative purpose only and may think of examples of various modifications, transformations, alterations, changes, and the like. For illustrative purposes, the apparatus according to an embodiment of the present invention is described with reference to the functional block diagrams. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present application is based on and claims the benefit of priority of Japanese Patent Application No. 2006-225914, filed on Aug. 22, 2006, the entire contents of which are hereby incorporated herein by reference.

INDUSTRIAL APPLICABILITY

The transmission device according to an embodiment of the present invention may be used in a wireless communication system.

The invention claimed is:

1. A transmission device, comprising:
a frequency scheduling part configured to:
   allocate either a resource block or a distributed-type resource block to each user, the resource block being consecutive frequency subcarrier blocks obtained by dividing a system bandwidth, and the distributed-type resource block being frequency subcarrier blocks discretely-distributed in the system bandwidth and being obtained by dividing the resource block into plural parts,
   assign identification numbers and locations of the distributed-type resource blocks obtained by dividing the resource block by a predetermined dividing number corresponding to an allocation unit number for distributed-type resource blocks allocated by the resource block, and
   determine the distributed-type resource blocks to be allocated to a user based on the assigned locations of the distributed-type resource blocks;
a mapping part configured to allocate transmission data to either the resource block or the distributed-type resource blocks in accordance with the allocation; and
a control information generating part configured to generate control information with respect to a mobile station to which either the resource block or the distributed-type resource blocks are allocated based on the identification numbers.

2. The transmission device according to claim 1, wherein the locations and the identification numbers of the distributed-type resource blocks differ depending on plural sectors divided from an area covered by a same base station.

3. The transmission device according to claim 1, wherein the distributed-type resource blocks are divided from each resource block into two and three parts.

4. The transmission device according to claim 1, wherein consecutive identification numbers are assigned to the distributed-type resource blocks belonging to a same resource block.

5. The transmission device according to claim 1, wherein the control information generating unit is configured to generate control information including an ID of a mobile station, information indicating the resource block or the distributed-type resource blocks allocated to the mobile station, and allocation information of the distributed-type resource blocks.

6. The transmission device according to claim 5, wherein the control information generating unit is configured to generate a value obtained by applying tree based resource allocation information when consecutive identification numbers are assigned to the distributed-type resource blocks belonging to a same resource block as the allocation information of the distributed-type resource blocks.

7. A transmission device, comprising:
a frequency scheduling part configured to:
   allocate either a resource block or a distributed-type resource block to each user, the resource block being consecutive frequency subcarrier blocks obtained by dividing a system bandwidth, and the distributed-type resource block being frequency subcarrier blocks discretely-distributed in the system bandwidth and being obtained by dividing the resource block into plural parts,
   assign identification numbers and locations of the distributed-type resource blocks obtained by dividing the resource block by a predetermined dividing number corresponding to an allocation unit number for distributed type resource blocks allocated by the resource block, and
   determine the distributed-type resource blocks to be allocated to a user;
a mapping part configured to allocate transmission data to either the resource block or the distributed-type resource blocks in accordance with the allocation; and
a control information generating part configured to generate control information with respect to a mobile station to which either the resource block or the distributed-type resource blocks are allocated based on the identification numbers.

8. The transmission device according to claim 7, wherein the number of the distributed-type resource blocks generated in the resource blocks is greater than the number of resource blocks used as the distributed-type resource blocks.

9. The transmission device according to claim 7, wherein the control information generating unit is configured to generate control information including an ID of a mobile station, the number of resource blocks used as the distributed-type resource blocks, the number of the distributed-type resource blocks generated in the resource blocks, and allocation information of the distributed-type resource blocks.

10. The transmission device according to claim 9, wherein the control information generating unit is configured to generate a value obtained by applying tree based resource allocation information when consecutive identification numbers are assigned to the distributed-type resource blocks belonging to a same resource block as the allocation information of the distributed-type resource blocks.

* * * * *